(12) United States Patent
Park et al.

(10) Patent No.: US 11,271,391 B2
(45) Date of Patent: Mar. 8, 2022

(54) APPARATUS AND METHOD FOR CONTROLLING LOW-VOLTAGE DC-TO-DC CONVERTER OF VEHICLE

(71) Applicants: Hyundai Motor Company, Seoul (KR); Kia Motors Corporation, Seoul (KR)

(72) Inventors: Sung Uk Park, Whasung-Si (KR); Dong Gyun Woo, Whasung-Si (KR); Hui Sung Jang, Whasung-Si (KR); Hyun Wook Seong, Whasung-Si (KR)

(73) Assignees: HYUNDAI MOTOR COMPANY, Seoul (KR); KIA NOTORS CORPORATION, Seoul (KR)

( * ) Notice: Subject to any disclaimer, the term of this patent is extended or adjusted under 35 U.S.C. 154(b) by 383 days.

(21) Appl. No.: 16/512,729

(22) Filed: Jul. 16, 2019

(65) Prior Publication Data
US 2020/0185945 A1 Jun. 11, 2020

(30) Foreign Application Priority Data
Dec. 5, 2018 (KR) .......................... 10-2018-0155323

(51) Int. Cl.
*H02J 7/00* (2006.01)
*H02H 9/02* (2006.01)
(Continued)

(52) U.S. Cl.
CPC ................. *H02H 9/02* (2013.01); *H02J 7/34* (2013.01); *H02J 1/082* (2020.01); *H02J 2207/20* (2020.01); *H02M 1/00* (2013.01); *H02M 1/0035* (2021.05)

(58) Field of Classification Search
CPC .... H02H 9/02; H02J 7/34; H02J 1/082; H02J 2207/20; H02J 7/00302; H02J 7/00306;
(Continued)

(56) References Cited

U.S. PATENT DOCUMENTS

| 10,065,509 B2* | 9/2018 | Shin ......................... B60L 50/15 |
| 2015/0244274 A1* | 8/2015 | Fahlenkamp ..... H02M 3/33523 363/21.15 |
| 2017/0158058 A1* | 6/2017 | Lee ........................ F02N 11/087 |

FOREIGN PATENT DOCUMENTS

KR  10-2008-0111194 A  12/2008

* cited by examiner

*Primary Examiner* — Richard Tan
(74) *Attorney, Agent, or Firm* — Morgan, Lewis & Bockius LLP

(57) ABSTRACT

An apparatus for controlling a low-voltage DC-to-DC converter of a vehicle for converting high-voltage power into low-voltage power may include a signal selector for selecting and outputting one of a charging-oriented voltage command for charging the battery or a preset burst mode voltage command for operation of the low-voltage DC-to-DC converter in a burst mode in which the battery cannot be charged, a battery charge/discharge current limiter for generating a voltage command compensation value for limiting charge current of the battery when the signal selector outputs the charging-oriented voltage command and limiting discharge current of the battery when the signal selector outputs the burst mode voltage command, and a controller for controlling an output voltage of the low-voltage DC-to-DC converter to follow a compensated voltage command generated by applying the voltage command compensation value to the voltage command output by the signal selector.

9 Claims, 4 Drawing Sheets

(51) Int. Cl.
*H02J 7/34* (2006.01)
*H02M 1/00* (2006.01)
*H02J 1/08* (2006.01)

(58) Field of Classification Search
CPC ...... H02J 7/342; H02J 2310/48; H02J 7/0068; H02M 1/0035; H02M 1/00; H02M 1/0025; H02M 3/04; Y02T 10/70; B60L 53/20; B60L 3/06; B60L 2210/14; B60L 2240/527; B60L 2240/549; B60Y 2200/92; B60Y 2200/91
USPC ......................................................... 320/135
See application file for complete search history.

APPARATUS AND METHOD FOR CONTROLLING LOW-VOLTAGE DC-TO-DC CONVERTER OF VEHICLE

CROSS REFERENCE TO RELATED APPLICATION

The present application claims priority of Korean Patent Application No. 10-2018-0155323 filed on Dec. 5, 2018, the entire contents of which is incorporated herein for all purposes by this reference.

BACKGROUND OF THE INVENTION

Field of the Invention

The present invention relates to an apparatus and method for controlling a low-voltage DC-to-DC converter and, more particularly, to an apparatus and method for controlling a low-voltage DC-to-DC converter, which is capable of protecting an auxiliary battery by limiting discharge current of a battery when the low-voltage DC-to-DC converter for converting high-voltage power into low-voltage power used as power of an electric load of the vehicle and charging power of the battery operates in a burst mode in which the auxiliary battery cannot be charged.

Description of Related Art

An ecofriendly vehicle using electrical energy, such as a hybrid vehicle and an electric vehicle, may include a high-voltage main battery for providing electrical energy to a motor for driving the vehicle and a low-voltage auxiliary battery for providing power to an electric load of the vehicle. A low-voltage DC-to-DC converter (LDC) configured for converting high-voltage power of the main battery into low-voltage power and providing the low-voltage power as charging power of the auxiliary battery is provided between the main battery and the auxiliary battery.

Conventionally, the LDC has been controlled in one mode selected among a constant current control mode for controlling the level of current provided to the low-voltage battery to a value corresponding to a current command, a constant voltage control mode for setting a specific voltage value set in a voltage command map as an output voltage command such that an actual output voltage follows the set output voltage command, and a burst mode in which the LDC does not provide power to the auxiliary battery, according to the state of the vehicle.

In particular, conventionally, if the LDC is controlled in the constant current control mode or the constant voltage control mode, charging power is provided to the auxiliary battery. At the instant time, the auxiliary battery was protected by preventing excessive charge current from being provided to the auxiliary battery using various control methods of limiting charge current according to the state of the vehicle.

However, in the burst mode in which power is not provided to the auxiliary battery, since the low-voltage DC-to-DC converter is controlled to output an allowable minimum voltage, the auxiliary battery is in a discharge state in which current is output. Conventionally, as described above, a method of limiting charge current to prevent the auxiliary battery from deteriorating due to excessive charge current was applied, but technology for preventing excessive discharge current from flowing when the auxiliary battery is discharged in the burst mode was not applied.

Conventionally, if the LDC operates in the burst mode, excessive discharge current may be generated in the auxiliary battery, causing deterioration of the auxiliary battery, causing problems in the auxiliary battery or shortening the lifespan of the auxiliary battery.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for controlling a low-voltage DC-to-DC converter, which is configured for appropriately limiting discharge current output from an auxiliary battery when a low-voltage DC-to-DC converter for providing power to the auxiliary battery operates in a burst mode in which the auxiliary battery cannot be charged.

In accordance with an aspect of the present invention, the above and other objects may be accomplished by an apparatus configured for controlling a low-voltage DC-to-DC converter of a vehicle for converting high-voltage power into low-voltage power used as power of an electric load of the vehicle and charging power of a battery including a signal selector configured to select and output one of a charging-oriented voltage command for charging the battery or a preset burst mode voltage command for operation of the low-voltage DC-to-DC converter in a burst mode in which the battery is not able to be charged, a battery charge/discharge current limiter configured to generate a voltage command compensation value for limiting charge current of the battery when the signal selector outputs the charging-oriented voltage command and limiting discharge current of the battery when the signal selector outputs the burst mode voltage command, and a controller configured to control an output voltage of the low-voltage DC-to-DC converter to follow a compensated voltage command generated by applying the voltage command compensation value to the voltage command output by the signal selector.

The battery charge/discharge current limiter may include a limit value selector configured to select and output one of a preset charge current limit value and a preset discharge current limit value depending on whether the low-voltage DC-to-DC converter operates in the burst mode and a current limit controller configured to generate the voltage command compensation value for allowing an actually measured value of current of the battery to follow the limit value output from the limit value selector.

The limit value selector may select and output the discharge current limit value when the low-voltage DC-to-DC converter operates in the burst mode and select and output the charge current limit value when the low-voltage DC-to-DC converter does not operate in the burst mode.

The limit value selector may further include a derating application unit configured to select and provide one of 0 and a value obtained by subtracting the actually measured value of the current of the battery from the limit value output from the limit value selector as input of the current limit controller, depending on whether derating of the low-voltage DC-to-DC converter is performed.

The derating application unit may provide the value obtained by subtracting the actually measured value of the current of the battery from the limit value output from the limit value selector as the input of the current limit controller when derating of the low-voltage DC-to-DC converter is not performed and provide 0 as input of the current limit controller when derating of the low-voltage DC-to-DC converter is performed.

The battery charge/discharge current limiter may include an upper/lower limit limiter configured to limit upper and lower limits of the voltage command compensation value output from the current limit controller, an upper limit determination unit configured to determine an upper limit of the upper/lower limit limiter depending on whether the low-voltage DC-to-DC converter operates in the burst mode, and a lower limit determination unit configured to determine a lower limit of the upper/lower limit limiter depending on whether the low-voltage DC-to-DC converter operates in the burst mode.

The upper limit determination unit may determine a value obtained by subtracting the voltage command output from the signal selector from a preset outputtable maximum voltage of the low-voltage DC-to-DC converter as the upper limit when the low-voltage DC-to-DC converter operates in the burst mode, and determine 0 as the upper limit when the low-voltage DC-to-DC converter does not operate in the burst mode.

The lower limit determination unit may determine 0 as the lower limit when the low-voltage DC-to-DC converter operates in the burst mode, and determine a value obtained by subtracting the voltage command output from the signal selector from a preset minimum voltage for startup of the vehicle as the lower limit when the low-voltage DC-to-DC converter does not operate in the burst mode.

In accordance with another aspect of the present invention, the above and other objects may be accomplished by a method of controlling a low-voltage DC-to-DC converter of a vehicle for converting high-voltage power into low-voltage power used as power of an electric load of the vehicle and charging power of a battery including determining whether the low-voltage DC-to-DC converter operates in a burst mode, selecting a pre-generated battery charging-oriented voltage command and a preset charge current limit value when the low-voltage DC-to-DC converter does not operate in the burst mode, performing compensation for decreasing the charging-oriented voltage command and controlling output of the low-voltage DC-to-DC converter using the compensated voltage command, when an actually measured value of current of the battery is greater than the charge current limit value, selecting a preset burst mode voltage command and a preset discharge current limit value when the low-voltage DC-to-DC converter operates in the burst mode, and performing compensation for increasing the burst mode voltage command and controlling output of the low-voltage DC-to-DC converter using the compensated voltage command, when the actually measured value of current of the battery is less than the discharge current limit value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
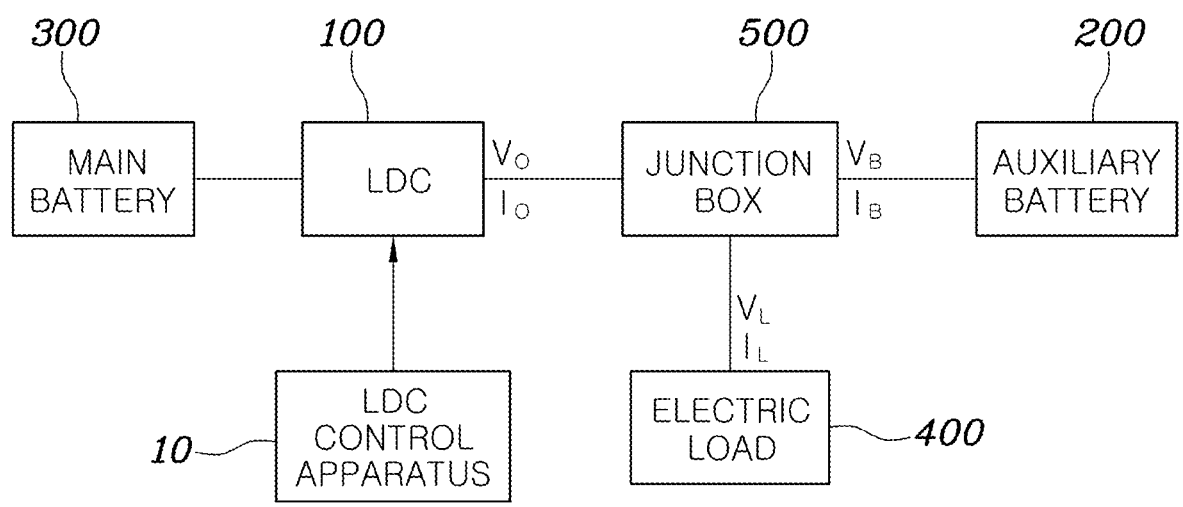
FIG. 1 is a schematic block diagram showing a power system of a vehicle, to which an apparatus and method for controlling a low-voltage DC-to-DC converter of a vehicle according to various embodiments of the present invention is applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an apparatus and method for controlling a low-voltage DC-to-DC converter of a vehicle according to various embodiments will be described with reference to the accompanying drawings.

FIG. 1 is a schematic block diagram showing a power system of a vehicle, to which an apparatus and method for controlling a low-voltage DC-to-DC converter of a vehicle according to various embodiments of the present invention is applicable.

As shown in FIG. 1, the apparatus 10 for controlling the converter for charging the battery of the vehicle according to various embodiments of the present invention controls a low-voltage DC-to-DC converter (LDC) 100.

The LDC 100 is provided between an auxiliary battery 200 and a main battery 300. The auxiliary battery 200 provides power to an electric load 400 of the vehicle and has a relatively low output voltage. The main battery 300 provides power to a motor configured for driving the vehicle and has a high output voltage. The LDC 100 down-converts the high-voltage power of the main battery 300 and outputs low-voltage power.

Meanwhile, the LDC 100, the auxiliary battery 200 and the electric load 400 may be connected at one node using an element such as a junction box 500. That is, the output voltage Vo and output current Io of the LDC 100 may be provided as the charging voltage $V_B$ and charge current $I_B$ of the auxiliary battery 20 through the junction box 50, and may be provided as power $V_L$ and $I_L$ of the electric load 40. The power stored in the auxiliary battery 200 may also be provided to the electric load 400 through the junction box 500.

In the power system of the vehicle, the apparatus 10 for controlling the converter for charging the battery of the vehicle according to various embodiments of the present invention may determine commands for controlling the output voltage and output current of the LDC 100 and generate and output pulse width modulation (PWM) signals for driving a switching element in the LDC 100 to correspond to the commands.

The LDC 100 may include a switching element PWM-controlled to determine an output voltage. The converter control apparatus 10 according to various embodiments of the present invention may control the switching element in the LDC 100 to generate a PWM signal for outputting a desired voltage or a PWM signal for outputting desired current. PWM control of the switching element of the LDC 100 is well-known technology in the field of converters and PWM integrated circuits (ICs) for generating PWM signals are commercially utilized. Therefore, a detailed description thereof will be omitted.

Various embodiments of the present invention relate to technology for generating a voltage command of the LDC 100 required for a PWM IC to generate a PWM signal.

Figure 2:
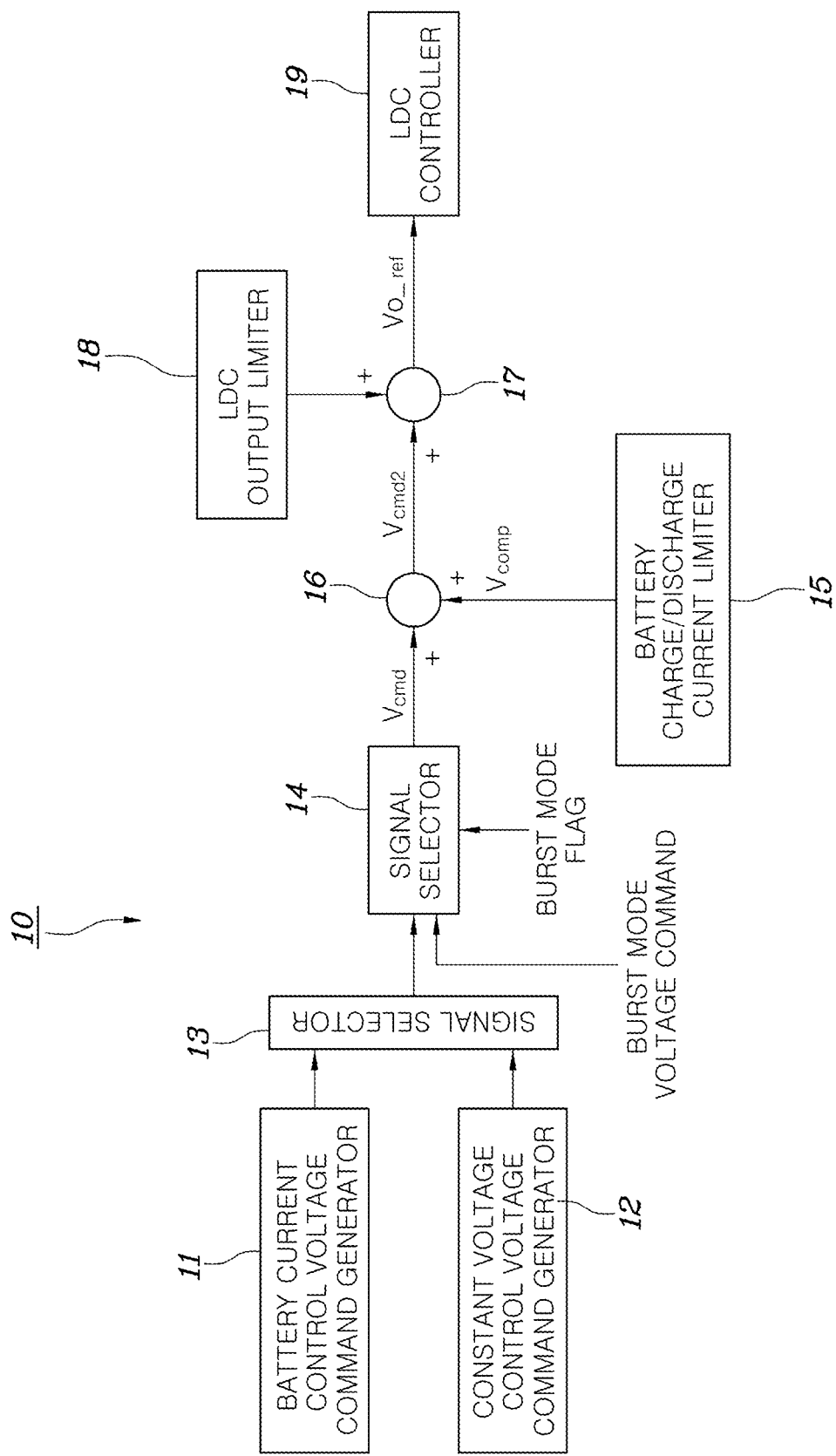
FIG. 2 is a block diagram showing an apparatus configured for controlling a low-voltage DC-to-DC converter of a vehicle according to an exemplary embodiment of the present invention.

FIG. 2 is a block diagram showing an apparatus configured for controlling a low-voltage DC-to-DC converter of a vehicle according to an exemplary embodiment of the present invention.

Referring to FIG. 2, the apparatus configured for controlling the converter for charging the battery of the vehicle according to the exemplary embodiment of the present invention may include a battery current control voltage command generator 11 for generating a first voltage command of the LDC 100 for controlling charge current of the auxiliary battery 200, a constant voltage control voltage command generator 12 for generating a second voltage command for controlling the constant voltage of the LDC 100, a first signal selector 13 for selecting one of the first voltage command and the second voltage command, a second signal selector 14 for selecting one of the voltage command selected by the first signal selector 13 and a bust mode voltage command depending on whether a burst mode flag of the LDC 100 is set, a battery charge/discharge current limiter 15 for providing a voltage command compensation value $V_{comp}$ applied depending on whether charge/discharge current of the battery is limited, and an LDC controller 19 for generating a PWM signal for controlling the switching element in the LDC 100 based on a difference between a compensated voltage command $V_{cmd2}$, which is obtained by applying the voltage command compensation value $V_{comp}$ to a voltage command $V_{cmd}$ selected by the second signal selector 14, and an actually measured value of the output voltage detected at the output terminal of the LDC 100.

In various embodiments of the present invention, generation of excessive charge current is limited by the output of the LDC 100 in the charging mode in which the auxiliary battery 200 is charged, and generation of excessive discharge current in the auxiliary battery 200 is limited when the LDC 100 operates in the burst mode not to provide power for charging the auxiliary battery 200 and thus the auxiliary battery 200 is in a discharge state. Accordingly, a method of generating an appropriate voltage command compensation value $V_{comp}$ configured for limiting battery charge/discharge current at the battery charge/discharge current limiter 15 may be a technical feature of the present invention.

The battery current control voltage command generator 11 may compare the actually measured value of the charge current provided to the auxiliary battery 200 with a preset battery charge current command value to generate the first voltage command for allowing the actually measured value of charge current to follow the charge current command value. The battery current control voltage command generator 11 may be a well-known controller such as a proportional integral controller or a proportional integral differential controller for receiving the difference between the actually measured value of the charge current and the charge current command value and decreasing the difference to converge on 0.

The constant voltage control voltage command generator 12 may determine a voltage command corresponding to the state of the vehicle using a preset voltage command map.

The first signal selector 13 selects the first voltage command for controlling battery charge current and the second voltage command for constant voltage control depending on whether the auxiliary battery is charged or a command of a host controller. The first signal selector 13 may not only select one of the first voltage command and the second voltage command but also determine whether the battery current control voltage command generator 11 and the constant voltage control voltage command generator 12 operate. That is, when control using the first voltage command is required, the battery current control voltage command generator 11 may operate and the constant voltage control voltage command generator 12 may stop, and vice versa. That is, when one of the battery current control voltage command generator 11 and the constant voltage control voltage command generator 12 operates, the first signal selector 13 may perform control to stop the other of the battery current control voltage command generator 11 and the constant voltage control voltage command generator 12.

The voltage command output from the first signal selector 13 controls the output current of the LDC 100 provided to the auxiliary battery 200 when charging of the auxiliary battery 200 is required or control the output voltage of the LDC 100 to a constant voltage in a state in which at least the auxiliary battery 200 is not discharged, and is a charging-oriented voltage command for charging the auxiliary battery 200.

The second signal selector 14 may select and output one of the charging-oriented voltage command for charging the auxiliary battery 200 output from the first signal selector 13 or a preset burst mode voltage command. Here, the burst mode voltage command is a value corresponding to a minimum output voltage in the LDC 100 and may be preset.

The second signal selector 14 may set one of the charging-oriented voltage command and the burst mode voltage command according to setting of a burst mode flag. For example, when the host controller sets the burst mode flag to "1" to control the LDC 100 in the burst mode, the second signal selector 14 may output the burst mode voltage command and, when the host controller sets the burst mode flag to "0" to control the LDC 100 in a general charging-oriented mode, the second signal selector 14 may output the charging-oriented voltage command received from the first signal selector 13. The set value of the burst mode flag is merely an example and operation of the second signal selector 14 according to the set value may be reversed.

The second signal selector 14 may be implemented by a multiplexer MUX for selecting output according to the set value of a specific flag. Of course, the first signal selector 13 may also be implemented by a multiplexer for selecting output according to the set value of a specific flag set by the host controller.

The battery charge/discharge current limiter 15 generates a voltage command compensation value $V_{comp}$ for limiting excessive charge current provided to the auxiliary battery 200 or excessive discharge current output from the auxiliary battery 200.

Figure 3:
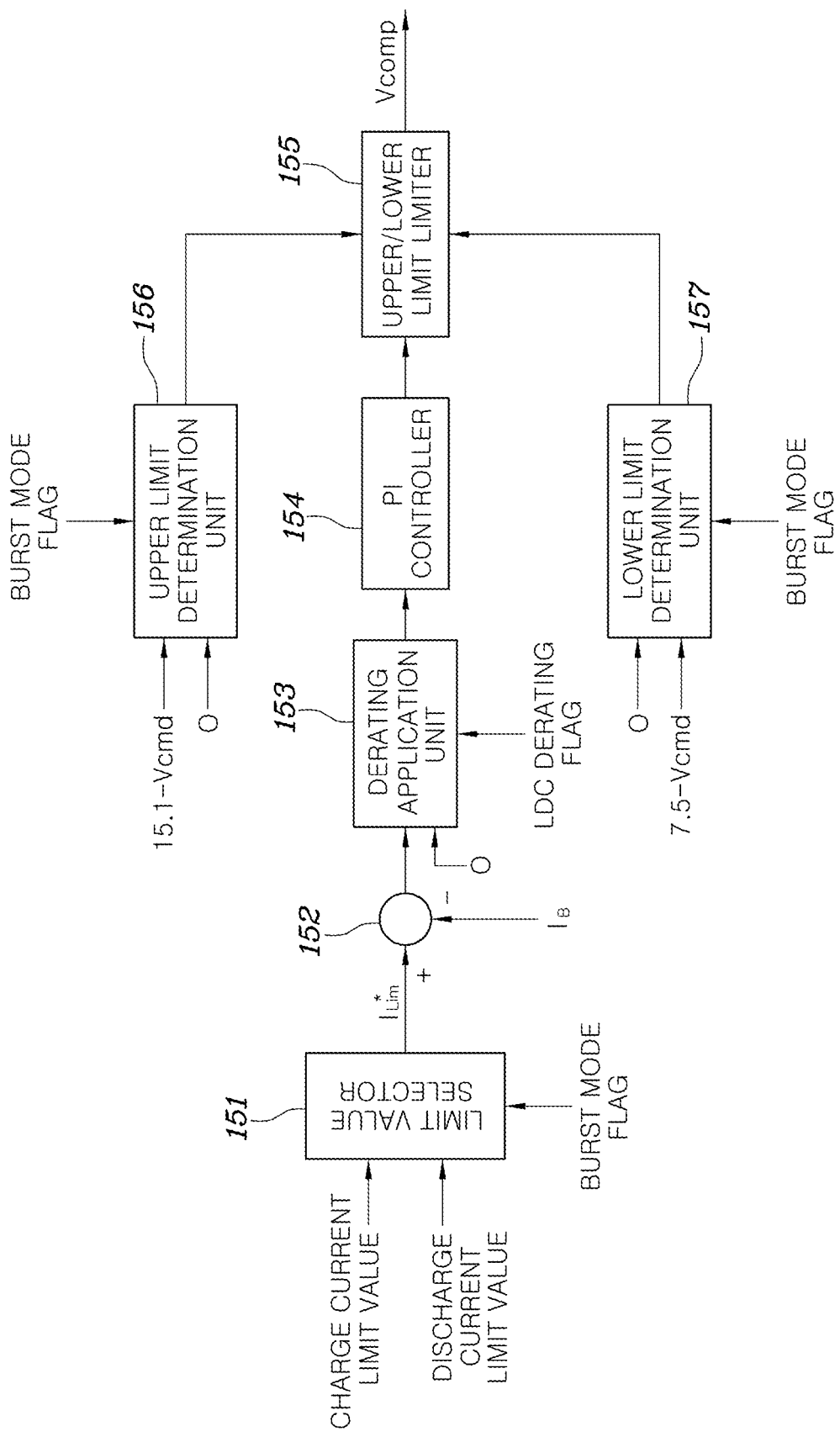
FIG. 3 is a block diagram showing a battery charge/discharge current limiter of an apparatus configured for controlling a low-voltage DC-to-DC converter of a vehicle according to an exemplary embodiment of the present invention in detail.

FIG. 3 is a block diagram showing a battery charge/discharge current limiter of an apparatus configured for controlling a low-voltage DC-to-DC converter of a vehicle according to an exemplary embodiment of the present invention in detail.

Referring to FIG. 3, the battery charge/discharge current limiter 15 may include a limit value selector 151 for selecting one of a preset charge current limit value and a preset discharge current limit value depending on whether the LDC 100 operates in the burst mode and a compensation value controller 154 for generating a voltage command compensation value for allowing an actually measured value of the current of the auxiliary battery 200 to follow the limit value output from the limit value selector 151.

The limit value selector 151 may select and output one of two limit values according to the set value of the burst mode flag like the first signal selector 13 and the second signal selector 14. For example, when the host controller sets the burst mode flag to "1" to control the LDC 100 in the burst mode, the limit value selector 151 may select and output the discharge current limit value and, when the host controller 200 sets the burst mode flag to "0" to control the LDC 100 in the general charging-oriented mode, the limit value selector 151 may select and output the charge current limit value. The limit value selector 151 may also be implemented by a multiplexer.

The current limit controller 154 implements a general control algorithm of a proportional integral controller or a proportional integral differential controller and may generate the voltage command compensation value $V_{comp}$ for allowing a difference between the output limit value $I_{lim}^*$ of the limit value selector 151 and the actually measured value $I_B$ of the current of the auxiliary battery 200, which is determined by a subtractor 152, to converge on 0.

The battery charge/discharge current limiter 15 may further include a derating application unit 153. When load current is greater than the rated output of the LDC 100 and thus derating of the LDC 100 is performed, limit of charge/discharge current of the auxiliary battery 200 by the LDC 100 may not be performed. The derating application unit 153 may select a value input to the current limit controller according to a derating flag set by the host controller.

For example, when the host controller does not perform derating of the LDC 100 and sets the derating flag to "0", the derating application unit 153 may select and provide the difference between the limit value output from the limit value selector 151 and the actually measured value of the current of the auxiliary battery as input of the current limit controller 154. When the host controller performs derating of the LDC 100 and sets the derating flag to "1", the derating application unit 153 may select and provide 0 as input of the current limit controller 154.

When derating of the LDC 100 is performed, the current limit controller 154 receives 0 and thus does not output the voltage command compensation value.

Furthermore, the battery charge/discharge current limiter 15 may include an upper/lower limit limiter 155 for limiting the upper and lower limits of the voltage command compensation value output from the current limit controller 154, an upper limit determination unit 156 for determining the upper limit of the upper/lower limit limiter 155, and a lower limit determination unit 157 for determining the lower limit of the upper/lower limit limiter.

The upper limit determination unit 156 and the lower limit determination unit 157 may determine the upper and lower limits depending on whether the LDC 100 operates in the burst mode. The upper limit determination unit 156 and the lower limit determination unit 157 may be implemented by a multiplexer for selectively outputting one of two inputs according to the set value of the burst mode flag set by the host controller.

In a state in which the LDC 100 is not in the burst mode, that is, the LDC 100 is controlled such that the auxiliary battery 200 is charged, the battery charge/discharge current limiter 15 should generate the voltage command compensation value for controlling charge current. Since the battery charge/discharge current limiter 15 should generate the voltage command compensation value for decreasing the voltage command of the LDC 100, the upper limit of the voltage command compensation value should be 0. Furthermore, since the voltage command of the LDC 100 is equal to or greater than a preset minimum voltage (e.g., 7.5V) for startup of the vehicle, the lower limit of the voltage command compensation value is a value obtained by subtracting the voltage command $V_{cmd1}$ selected by the second signal selector 14 from the minimum voltage for startup.

In contrast, in a state in which the LDC 100 is in the burst mode, the battery charge/discharge current limiter 15 should generate the voltage command compensation value for controlling discharge current. Since the battery charge/discharge current limiter 15 should generate the voltage command compensation value configured for increasing the voltage command of the LDC 100 such that the LDC 100 outputs current, the lower limit of the voltage command compensation value should be 0. Furthermore, since the level of the outputtable maximum value of the LDC 100 is predetermined, the upper limit of the voltage command compensation value should be a value obtained by subtracting the voltage command $V_{cmd}$ selected by the second signal selector 14 from the outputtable maximum value of the LDC 100.

That is, the upper limit determination unit 156 outputs the value obtained by subtracting the voltage command $V_{cmd}$ selected by the second signal selector 14 from the outputtable maximum value of the LDC 100 when the LDC 100 is in the burst mode and outputs 0 as the upper limit of the upper/lower limit limiter 155 when the LDC 100 is not in the burst mode.

Furthermore, the lower limit determination unit 157 outputs 0 as the upper limit of the upper/lower limit limiter 155 when the LDC 100 is in the burst mode and outputs the value obtained by subtracting the voltage command $V_{cmd}$ selected by the second signal selector 14 from the minimum voltage for startup of the vehicle as the lower limit of the upper/lower limit limiter 155 when the LDC 100 is not in the burst mode.

The apparatus configured for controlling the low-voltage DC-to-DC converter of the vehicle according to the exemplary embodiment of the present invention generates the voltage command for limiting the charge current and discharge current of the auxiliary battery 200 depending on whether the low-voltage DC-to-DC converter enters the burst mode to control the output of the low-voltage DC-to- DC converter, preventing excessive charge current from being provided to the auxiliary battery 200 or preventing excessive discharge current from being output from the auxiliary battery 200. Therefore, it is possible to prevent the auxiliary battery 200 from deteriorating and to extend the lifespan of the auxiliary battery 200.

Meanwhile, the apparatus configured for controlling the low-voltage DC-to-DC converter of the vehicle according to the exemplary embodiment of the present invention may further include an LDC output limiter 18. The LDC output limiter 18 provides the voltage command compensation value for limiting the output current of the LDC 100 when the electric load 400 is equal to or greater preset rated capacity of the LDC 100.

In FIG. 2, reference numerals 16 and 17 are adders for adding various voltage command compensation values to the voltage command. In FIG. 3, reference numeral 152 is a subtractor for subtracting the actually measured value of the current of the auxiliary battery 200 from the current limit value selected by the limit value selector 151.

The method of controlling the low-voltage DC-to-DC converter of the vehicle according to the exemplary embodiment of the present invention may be implemented by the apparatus configured for controlling the low-voltage DC-to-DC converter of the vehicle according to the exemplary embodiment of the present invention.

Figure 4:
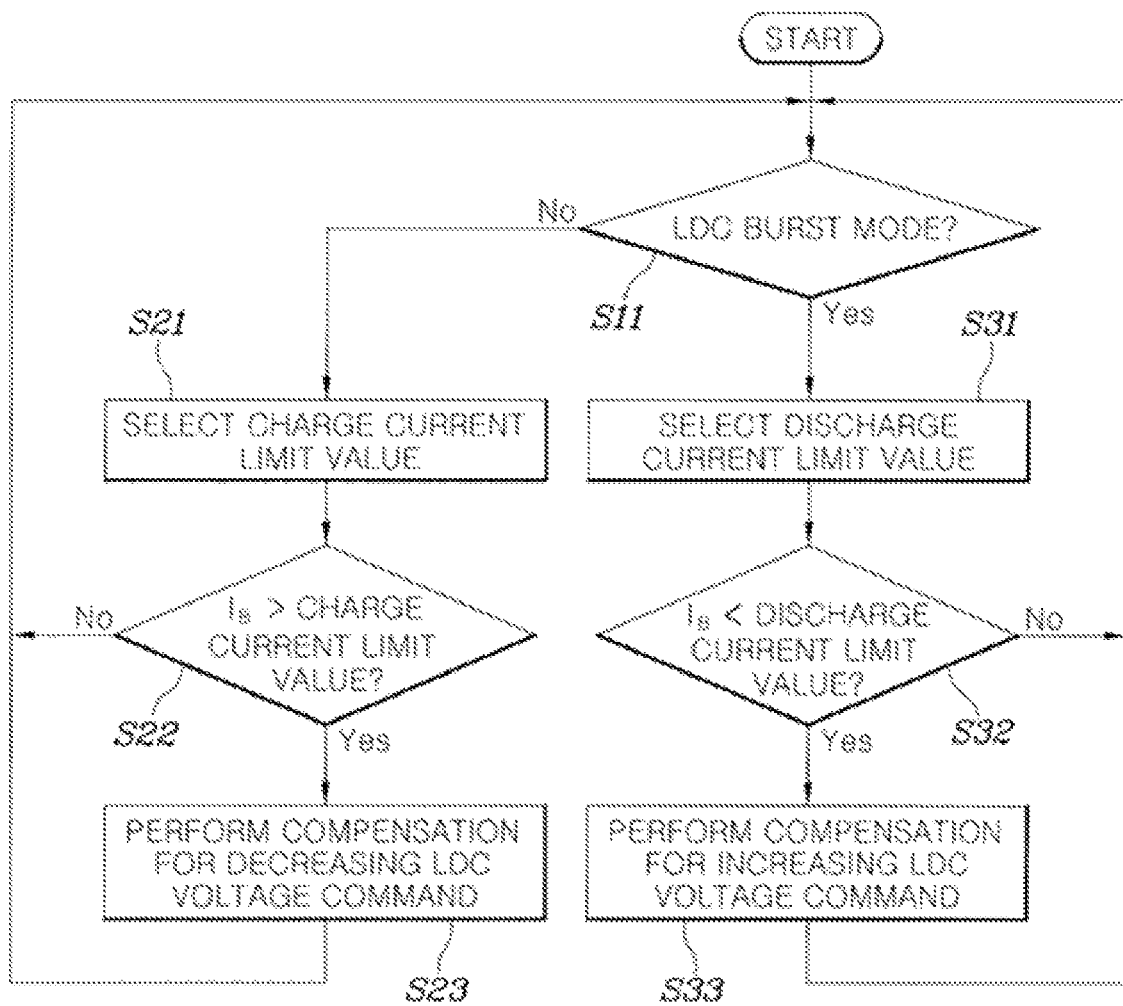
FIG. 4 is a flowchart showing a method of controlling a low-voltage DC-to-DC converter of a vehicle according to an exemplary embodiment of the present invention.

FIG. 4 is a flowchart showing a method of controlling a low-voltage DC-to-DC converter of a vehicle according to an exemplary embodiment of the present invention.

Referring to FIG. 4, the method of controlling the low-voltage DC-to-DC converter of the vehicle according to the exemplary embodiment of the present invention may include step S11 of, at the host controller, determining whether the low-voltage DC-to-DC converter 100 of the vehicle is in the burst mode, step S21 of selecting the charging-oriented voltage command generated by the battery current control voltage command generator 11 and the constant voltage control voltage command generator 12 at the second signal selector 14 and selecting the preset charge current limit value at the limit value selector 151, when the low-voltage DC-to-DC converter 100 operates in the charging-oriented mode, not in the burst mode, step S23 of performing compensation for decreasing the charging-oriented voltage command and controlling the LDC using the compensated voltage command when the actually measured value of the current of the auxiliary battery 200 is greater than the charge current limit value (S22), step S31 of selecting the preset burst mode voltage command at the second signal selector 14 and selecting the preset discharge current limit value at the limit value selector 151, when the low-voltage DC-to-DC converter 100 is in the burst mode, and step S33 of performing compensation for increasing the burst mode voltage command and controlling the LDC using the compensated voltage command when the actually measured value of the current of the auxiliary battery 200 is less than the discharge current limit value (S32).

Steps S22, S23, S32 and S33 may be implemented by the upper limit determination unit 156 and the lower limit determination unit 157 setting the upper and lower limits of the upper and lower limit limiter 155 for limiting the voltage command compensation value generated by the current limit controller 154 depending on whether the LDC operates in the burst mode or not. That is, the upper/lower limit limiter 155 outputs the voltage command compensation value less than 0 when the LDC 10 does not operate in the burst mode, performing compensation for decreasing the voltage command when the actually measured value of the current of the auxiliary battery 200 is greater than the charge current limit value. The upper/lower limit limiter 155 outputs the voltage command compensation value greater than 0 when the LDC 10 operates in the burst mode, performing compensation for increasing the voltage command when the actually measured value of the current of the auxiliary battery 200 is less than the discharge current limit value.

According to the apparatus configured for controlling the low-voltage DC-to-DC converter of the vehicle, since the number of times of charging/discharging the auxiliary battery may be minimized, it is possible to increase the lifespan of the auxiliary battery, to improve merchantability, and to reduce service costs which may occur in the future.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for controlling a low-voltage DC-to-DC converter of a vehicle for converting high-voltage power into low-voltage power used as power of an electric load of the vehicle and charging power of a battery, the apparatus comprising:
   a signal selector configured to select and output one of a charging-oriented voltage command for charging the battery or a predetermined burst mode voltage command for operation of the low-voltage DC-to-DC converter in a burst mode in which the battery is not charged;
   a battery charge/discharge current limiter configured to generate a voltage command compensation value for limiting charge current of the battery when the signal selector outputs the charging-oriented voltage command and limiting discharge current of the battery when the signal selector outputs the predetermined burst mode voltage command; and
   a controller configured to control an output voltage of the low-voltage DC-to-DC converter to follow a compensated voltage command generated by applying the voltage command compensation value to the voltage command output by the signal selector.

2. The apparatus according to claim 1, wherein the battery charge/discharge current limiter includes:
   a limit value selector configured to select and output one limit valve of a predetermined charge current limit value and a predetermined discharge current limit value depending on when the low-voltage DC-to-DC converter operates in the burst mode; and
   a current limit controller configured to generate the voltage command compensation value for allowing a measured value of current of the battery to follow the one limit value output from the limit value selector.

3. The apparatus according to claim 2,
   wherein the limit value selector selects and outputs the predetermined discharge current limit value when the low-voltage DC-to-DC converter operates in the burst mode and selects and outputs the predetermined charge current limit value when the low-voltage DC-to-DC converter does not operate in the burst mode.

4. The apparatus according to claim 2, wherein the limit value selector further includes a derating application unit configured to select and provide one of 0 and a value obtained by subtracting the measured value of the current of the battery from the one limit value output from the limit value selector as input of the current limit controller, depending on when derating of the low-voltage DC-to-DC converter is performed.

5. The apparatus according to claim 4, wherein the derating application unit provides the value obtained by subtracting the measured value of the current of the battery from the one limit value output from the limit value selector as the input of the current limit controller when derating of the low-voltage DC-to-DC converter is not performed and provides 0 as input of the current limit controller when derating of the low-voltage DC-to-DC converter is performed.

6. The apparatus according to claim 2, wherein the battery charge/discharge current limiter includes:
an upper/lower limit limiter configured to limit upper and lower limits of the voltage command compensation value output from the current limit controller;
an upper limit determination unit configured to determine the upper limit of the upper/lower limit limiter depending on when the low-voltage DC-to-DC converter operates in the burst mode; and
a lower limit determination unit configured to determine the lower limit of the upper/lower limit limiter depending on when the low-voltage DC-to-DC converter operates in the burst mode.

7. The apparatus according to claim 6, wherein the upper limit determination unit is configured to:
determine a value obtained by subtracting the voltage command output from the signal selector from a predetermined outputtable maximum voltage of the low-voltage DC-to-DC converter as the upper limit when the low-voltage DC-to-DC converter operates in the burst mode, and
determine 0 as the upper limit when the low-voltage DC-to-DC converter does not operate in the burst mode.

8. The apparatus according to claim 6, wherein the lower limit determination unit is configured to:
determine 0 as the lower limit when the low-voltage DC-to-DC converter operates in the burst mode, and
determine a value obtained by subtracting the voltage command output from the signal selector from a predetermined minimum voltage for startup of the vehicle as the lower limit when the low-voltage DC-to-DC converter does not operate in the burst mode.

9. A method of controlling a low-voltage DC-to-DC converter of a vehicle for converting high-voltage power into low-voltage power used as power of an electric load of the vehicle and charging power of a battery, the method comprising:
determining, by a controller, when the low-voltage DC-to-DC converter operates in a burst mode;
selecting, by the controller, a pre-generated battery charging-oriented voltage command and a predetermined charge current limit value when the low-voltage DC-to-DC converter does not operate in the burst mode;
performing, by the controller, compensation for decreasing the pre-generated battery charging-oriented voltage command and controlling output of the low-voltage DC-to-DC converter using a compensated voltage command, when a measured value of current of the battery is greater than the predetermined charge current limit value;
selecting, by the controller, a predetermined burst mode voltage command and a predetermined discharge current limit value when the low-voltage DC-to-DC converter operates in the burst mode; and
performing, by the controller, compensation for increasing the predetermined burst mode voltage command and controlling output of the low-voltage DC-to-DC converter using the compensated voltage command, when the measured value of the current of the battery is less than the predetermined discharge current limit value.

* * * * *